(12) United States Patent
Kazaoka et al.

(10) Patent No.: US 8,303,146 B2
(45) Date of Patent: Nov. 6, 2012

(54) SIDE TURN SIGNAL LAMP

(75) Inventors: Shigehiko Kazaoka, Shizuoka (JP); Haruhito Takahashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 106 days.

(21) Appl. No.: 12/875,185

(22) Filed: Sep. 3, 2010

(65) Prior Publication Data

US 2011/0058385 A1 Mar. 10, 2011

(30) Foreign Application Priority Data

Sep. 4, 2009 (JP) ................. 2009-204657

(51) Int. Cl.
*B60Q 1/26* (2006.01)
(52) U.S. Cl. .................. 362/494; 362/511; 362/540
(58) Field of Classification Search .................. 362/135, 362/494, 511, 540, 541, 542, 545, 558
See application file for complete search history.

(56) References Cited

U.S. PATENT DOCUMENTS

| | | | | |
|---|---|---|---|---|
| 6,299,334 B1 * | 10/2001 | Schwanz et al. | .............. | 362/511 |
| 6,508,576 B2 * | 1/2003 | Emmelmann et al. | ........ | 362/545 |
| 7,510,311 B2 * | 3/2009 | Romas et al. | ................. | 362/494 |
| 2006/0262550 A1 | 11/2006 | Pastrick et al. | | |

FOREIGN PATENT DOCUMENTS

| | | |
|---|---|---|
| DE | 10000992 A1 | 7/2001 |
| DE | 10238264 A1 | 3/2004 |
| DE | 202006003392 U1 | 5/2006 |
| DE | 102005019093 A1 | 10/2006 |
| EP | 1304260 A1 | 4/2003 |
| JP | 2006-114309 A | 4/2006 |

OTHER PUBLICATIONS

Extended European Search Report issued on Nov. 5, 2010 in the corresponding European Patent Application No. 10175162.6.

* cited by examiner

Primary Examiner — Y My Quach Lee
(74) Attorney, Agent, or Firm — Sughrue Mion, PLLC (57) ABSTRACT

A side turn signal lamp includes a light guide member having a light guide lens and a plurality of LEDs. The light guide lens includes a front surface and a light entry end face. The light guide lens includes a front surface and a light entry end face. The front surface is configured to correspond to a laterally extending opening in an outer side wall of a side mirror housing so as to guide the light through the opening. The light guide lens is configured to have a width that corresponds to the opening having a shape of a slit in a front view and such that the light entry end face extends in a front-rear direction of the side turn signal lamp. The LEDs are arranged in the front-rear direction to directly face the light entry end face.

8 Claims, 9 Drawing Sheets

SIDE TURN SIGNAL LAMP

CROSS-REFERENCE TO RELATED APPLICATIONS

The present application claims priority from Japanese Patent Application No. 2009-204657 filed on Sep. 4, 2009, the entire content of which is incorporated herein by reference.

FIELD OF INVENTION

Apparatuses consistent with the present invention relate to a side turn signal lamp provided together with a side mirror of an automobile.

DESCRIPTION OF RELATED ART

A related art side turn signal lamp includes a laterally extending light guide lens and a plurality of LEDs aligned to face a light entry end face of the light guide lens. The light guide lens has a curved front surface that fits a laterally wide opening in a curved outer side wall of a side mirror housing. The light guide lens is arranged such that the front surface is exposed via the opening of the side mirror housing (see, e.g., JP 2006-114309 A).

In order to ensure sufficient quantity of light, the side turn signal lamp described in JP 2006-114309 A uses four LEDs that are aligned in a in width direction of the light entry end face of the light guide lens, i.e. in a height direction of the lamp.

However, this structure increases the size of the side turn signal lamp accommodating the light guide lens and the LEDs therein, narrowing a space for accommodating a mirror, a mirror actuating mechanism and the like inside a side mirror housing. Accordingly, the layout freedom in designing a side mirror is limited. Further, the side turn signal lamp may not be able to be employed in a small-size car having a relatively small side mirror housing.

Downsizing of the side turn signal lamp may be possible by using a single high-intensity LED as a light source to narrow the width of the light guide lens. However, high-intensity LEDs are very expensive, which conflicts with needs for cost reduction.

BRIEF SUMMARY

Illustrative aspects of the present invention provide a side turn signal lamp which ensures a desired quantity of light while narrowing a light guide lens to reduce the size of the lamp.

According to an illustrative aspect of the present invention, a side turn signal lamp includes a light guide member having a light guide lens and a plurality of LEDs configured to serve as a light source of the side turn signal lamp. The light guide lens includes a front surface and a light entry end face from which light emitting from the LEDs enters the light guide lens. The front surface is configured to correspond to a laterally extending opening in an outer side wall of a side minor housing so as to guide the light though the opening. The light guide lens is configured to have a width that corresponds to the opening having a shape of a slit in a front view and such that the light entry end face extends in a front-rear direction of the side turn signal lamp. The LEDs are arranged in the front-rear direction to directly face the light entry end face.

Other aspects and advantages of the invention will be apparent from the following description, the drawings and the claims.

DETAILED DESCRIPTION

Hereinafter, exemplary embodiments of the present invention will be described in detail. However, the following exemplary embodiments do not limit the scope of the claimed invention, and all combinations of features of the exemplary embodiment are not necessarily required to address the problem described above.

According to an exemplary embodiment of the present invention, a side turn signal lamp includes a light guide member having a light guide lens and a plurality of LEDs configured to serve as a light source of the side turn signal lamp. The light guide lens includes a front surface and a light entry end face from which light emitting from the LEDs enters the light guide lens. The front surface is configured to correspond to a laterally extending opening in an outer side wall of a side mirror housing so as to be guide the light through the opening. The light guide lens is configured to have a width that corresponds to the opening having a shape of a slit in a front view and such that the light entry end face extends in a front-rear direction of the side turn signal lamp. The LEDs are arranged in the front-rear direction to directly face the light entry end face.

Because the light guide lens is configured to have a narrow width, the width of the side turn signal lamp can be reduced accordingly.

The side mirror housing is configured such that an internal distance in the front-rear direction increases from a distal end of the side mirror housing toward a base end of the side mirror housing where the side mirror housing is attached to a vehicle. Therefore, in the base end section of the side mirror housing, there is a room for the light entry end face of the light guide lens to extend in the front-rear direction and for the LEDs to be arranged in the front-rear direction, without interfering with a mirror or a mirror actuating mechanism that are also accommodated in the side mirror housing.

Accordingly, the LEDs are arranged in the front-rear direction such that the LEDs directly face the light entry end face of the light guide lens, whereby light emitting from the LEDs efficiently enters the light guide lens and are guided by the light guide lens to provide sufficient quantity of light.

Because the side turn signal lamp can be downsized, layout freedom in designing a side mirror is improved. Further, a desired quantity of light is ensured even if the side turn signal lamp is downsized. Therefore, the side turn signal lamp can be used in a wide range of types of vehicle including a large-sized car having a relatively large side mirror as well as a small-sized car having a relatively small side mirror.

The light guide lens may be configured such that a thickness of the light guide lens decreases toward a distal end of the light guide lens.

The internal distance of the side mirror housing decreases toward the distal end of the side minor housing. Thus, by reducing the thickness of the light guide lens toward the distal end of the light guide lens accordingly, the light guide member can guide the light toward the distal end of the side mirror housing, where a light distribution oriented obliquely rearward with respect to a front-rear direction of the vehicle can be provided, without interfering the mirror accommodating in the side mirror housing. By forming the light distribution that is oriented obliquely rearward with respect to the front-rear direction of the vehicle, the signal light from the side turn signal lamp can reliably be visually recognized from a region obliquely rearward from the vehicle.

The light guide lens may further include a rear surface having a first reflecting step configured to reflect a first part of the light entering the light entry end face from a first LED to form a first light distribution outgoing from a first position on the front surface, and a second step configured to reflect a second part of the light entering the light entry end face from a second LED, which is disposed behind the first LED in the front-rear direction of the side turn signal lamp, to form a second light distribution outgoing from a second position on the front surface. A distance from the light entry end face to the first position is longer than a distance from the light entry end face to the second position, and the first light distribution is oriented more rearward than the second light distribution.

The light emitted from the first LED, which is disposed in front of the second LED in the front-rear direction of the side-turn signal lamp, enters the light guide member from the light entry end face, and is totally reflected back internally by the front surface of the light guide lens. The reflected light is guided toward the distal end of the light guide lens, and is further reflected by the first reflecting step on the rear surface of the light guide lens toward the first position on the front surface near the distal end of the light guide lens, thereby providing the first light distribution oriented obliquely rearward from the vehicle. In order to guide the light to the outside of the light guide lens, an incidence angle of the light with respect to a boundary surface (the front surface of the light guide lens) is required to be less than a critical angle. Therefore, a curvature of the front surface of the light guide lens where the first position is located is designed to satisfy this condition.

The light emitted from the second LED is reflected by the second reflecting step on the rear surface of the light guide lens toward the second position on the front surface, which is located in a central part of the front surface in the longitudinal direction of the light guide lens, thereby providing the second light distribution oriented obliquely laterally from the vehicle.

Therefore, the light from the side turn signal lamp can be distributed over a wide range from the lateral direction to the obliquely rearward direction with respect to the front-rear direction of the vehicle, whereby the signal light from the side turn signal lamp can be visually recognized more reliably.

The side turn signal lamp may further include a lamp body having a bracket via which the side turn signal lamp is attached to the side mirror housing, a printed board on which the LEDs are mounted, and a connection terminal arranged to protrude from the printed board. The light guide member may further include a skirt portion arranged to surround the light guide lens, and a seal leg arranged along a perimeter of the skirt portion. The light guide member may be configured as a one-piece structure. The LEDs, the printed board, and the connection terminal are arranged to form an LED unit assembly. The seal leg of the light guide member is joined to the lamp body such that the LED unit assembly is accommodated in a space between the light guide member and the lamp body.

That is, the side turn signal lamp, including the light guide lens and the LEDs, is configured as a single structure. Therefore, by attaching the bracket to the side mirror housing, the side turn signal lamp can be mounted in a proper position such that the front surface of the light guide lens is exposed via the opening in the outer side wall of the side minor housing.

Figure 1:
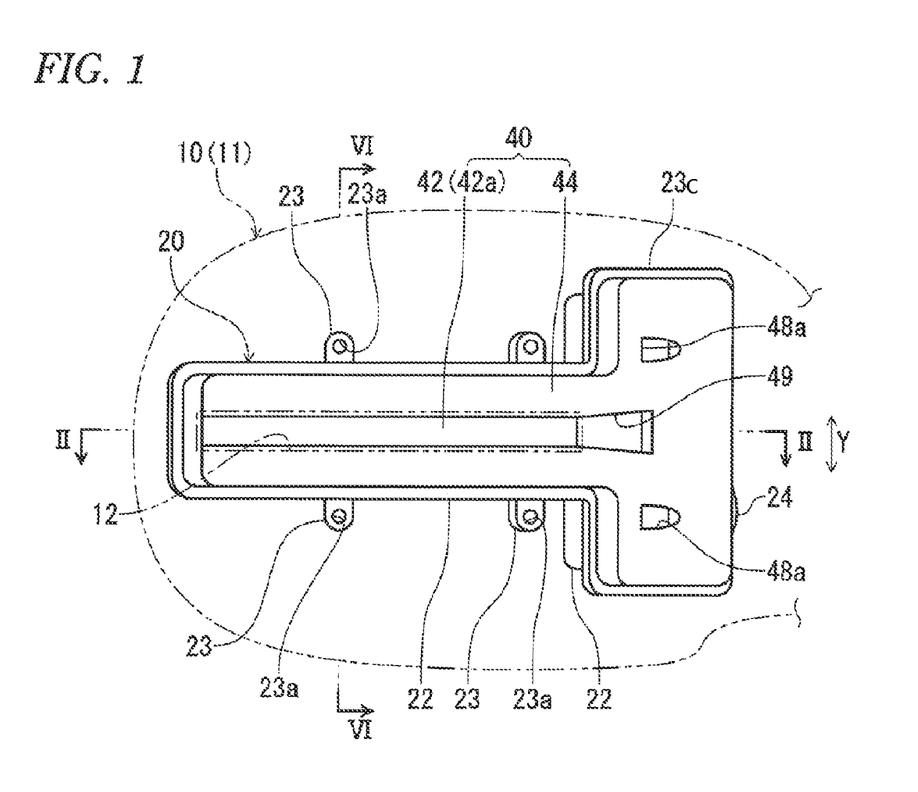
FIG. 1 is a front view of a side turn signal lamp according to a first exemplary embodiment of the invention.
Figure 2:
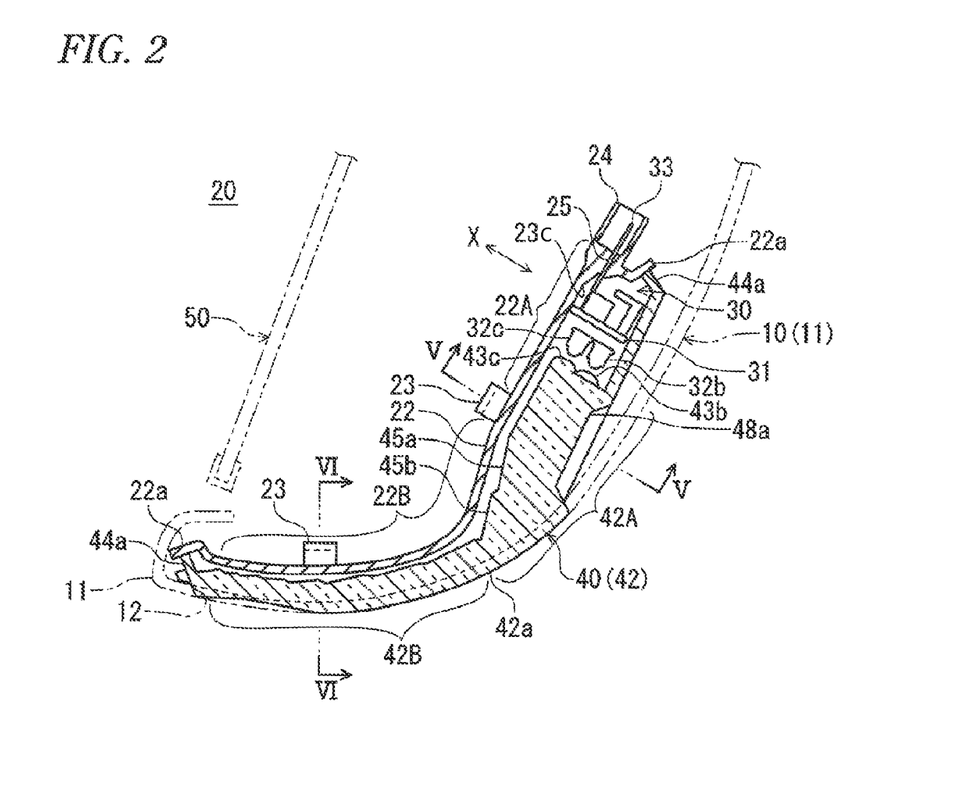
FIG. 2 is a horizontal sectional view of side turn signal lamp taken along the line II-II in FIG. 1.

Hereinafter, exemplary embodiments of the present invention will be described in detail with reference to the drawings. FIGS. 1 and 2 illustrate a side mirror housing 10 supporting a side mirror 50, and a side turn signal lamp 20 according to a first exemplary embodiment of the present invention. The side mirror housing 10 is made of synthetic resin, and has a curved outer side wall 11 formed with a narrow opening 12 extending in the lateral direction. The opening 12 has a shape of a slit, and has a width of, for example, about 6 mm. The side turn signal lamp 20 is arranged on an inner side of the opening 12 of the outer side wall 11. As shown in FIG. 1, the side turn signal lamp 20 is configured like a T-shape as a whole in a front view, and is longer in the lateral direction than in a height direction.

The side turn signal lamp 20 includes a resin made lamp body 22 having a T-shape in a front view, an LED unit assembly 30, and a transparent resin made light guide member 40 having a T-shape in a front view so as to substantially match the shape of the lamp body 22. The lamp body 22 has a base section 22A having a shape of a shallow basin and an extending section 22B which extends from the base section 22A in a rearwardly curved manner with a slightly narrower width than the base section 22A. The LED unit assembly 30 is accommodated by the base section 22A of the lamp body 22. A horizontal cross section of the light guide member 40 is curved along the curved outer side wall 11 of the housing 10. The light guide member 40 is joined to the lamp body 22 along a perimeter of the lamp body 22 by welding. The lamp body 22 has brackets 23. Each of the brackets 23 has a screw insertion hole 23a for securing a fastening screw to attach the side turn signal lamp 20 to the side mirror housing 10.

Figure 3:
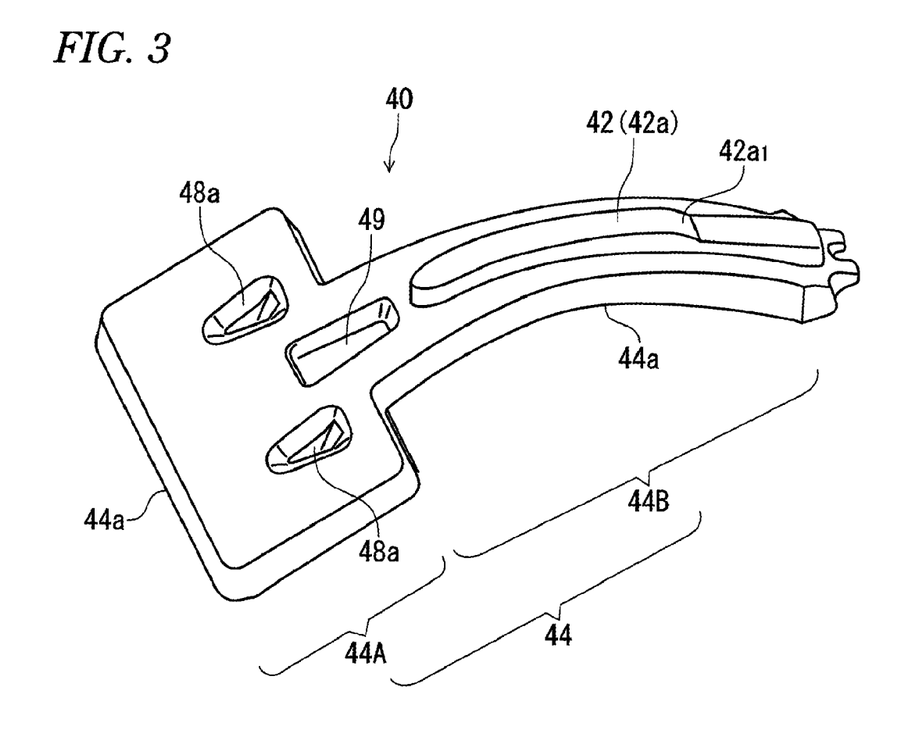
FIG. 3 is a front perspective view of a light guide member of the side turn signal lamp.
Figure 4:
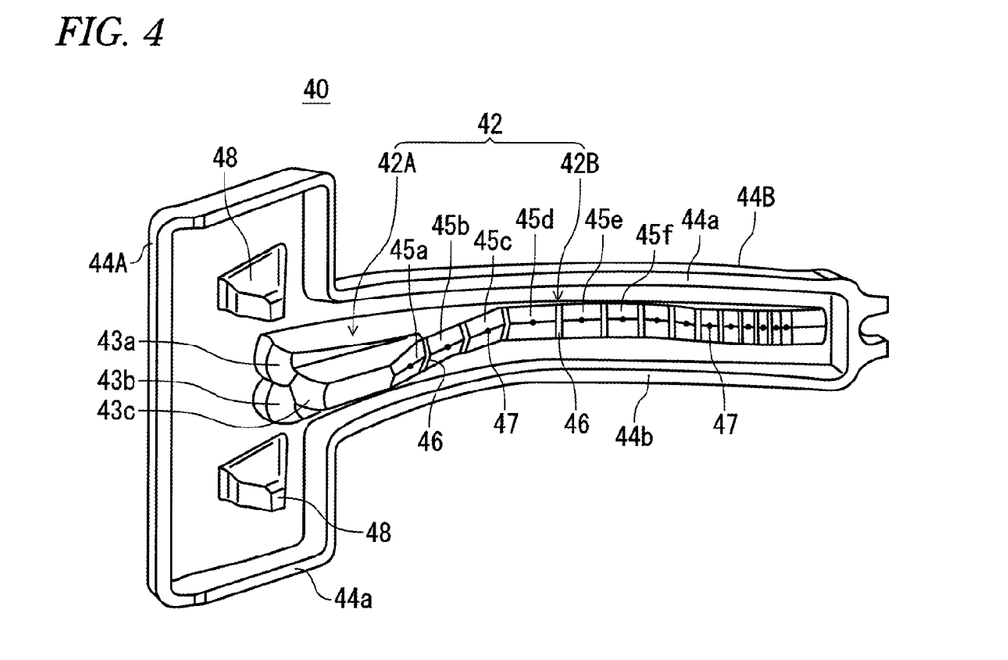
FIG. 4 is a rear perspective view of the light guide member.

As shown in FIGS. 3 and 4, the light guide member 40 includes a light guide lens 42 and a skirt portion 44 surrounding the light guide lens 42. The light guide lens 42 and the skirt portion 44 are formed as a one-piece structure. When light emitted from a light source enters the light guide lens 42, the light guide lens 42 guides the light to distribute the light in given directions. The light guide member 40 is configured to provide an accommodating space on a rear side thereof.

Figure 5:
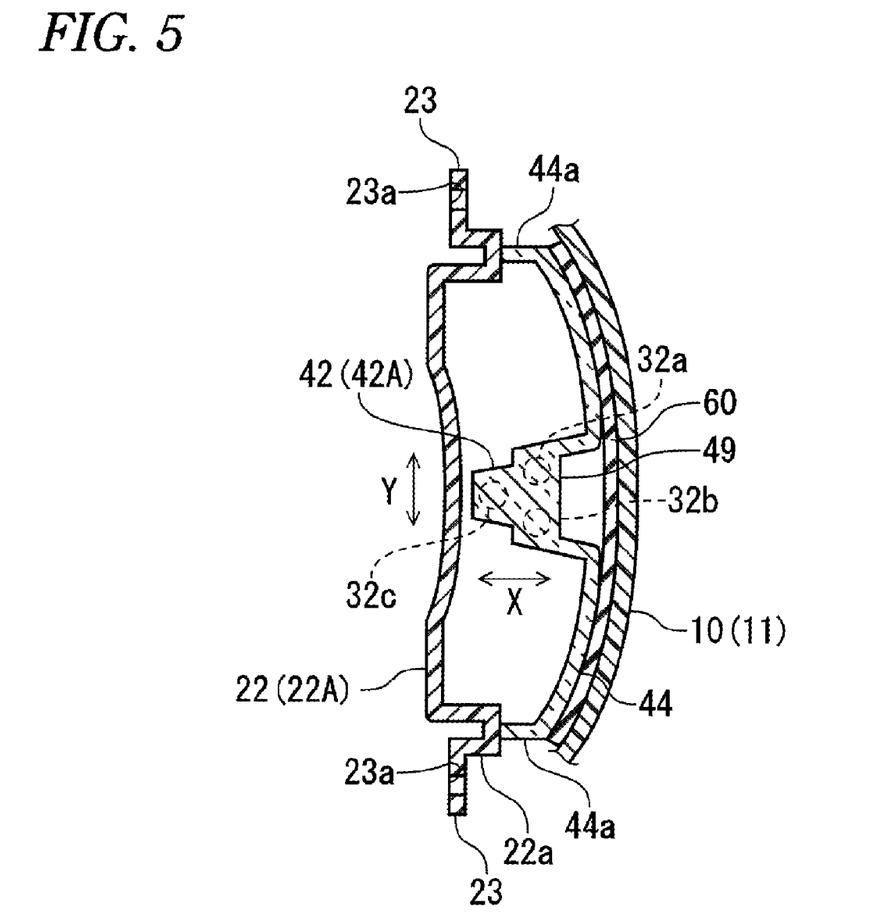
FIG. 5 is a vertical sectional view of the side turn signal lamp taken along the line V-V in FIG. 2.
Figure 6:
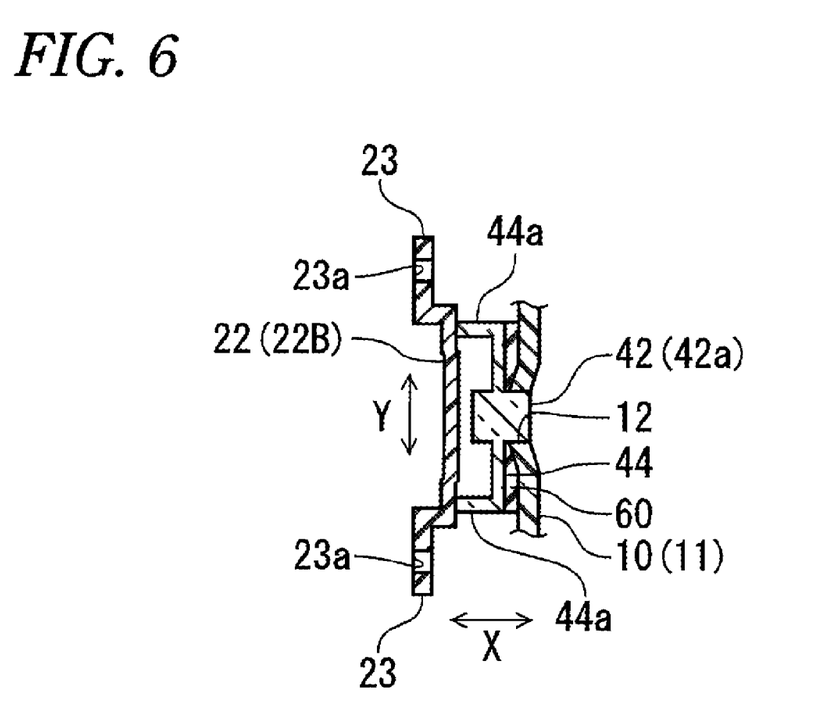
FIG. 6 is another vertical sectional view of the side turn signal lamp taken along the line VI-VI in FIGS. 1 and 2.

More specifically, as shown in FIG. 3, the light guide member 40 has a front surface 42a which is projected from the upper surface of the skirt portion 44. As shown in FIGS. 2, 5 and 6, when the lamp 20 is attached to the inner side of the outer side wall 11 of the housing 10, the skirt portion 44 is arranged along the inner side of the outer side wall 11, and the front surface 42a of the light guide lens 42 fits into the opening 12 and is exposed to the outside via the opening 12. Alternatively, the front surface 42a of the light guide lens 42 may not fit into the opening 12 and/or may not be directly exposed to the outside via the opening 12.

The light guide lens 42 includes a base section 42A and an extending section 42B extending from the base section 42A. The base section 42A is thicker than the extending section 42B in a front-rear direction X of the side turn signal lamp 20 such that the base section 42A has an inwardly protruded cross section. The base section 42A is wider than the extending section 42B in a height direction Y of the side turn signal lamp 20. The extending section 42B has a rectangular cross section that matches to the width of the opening 12 in the height direction Y.

As shown in FIGS. 4 and 5, the end portion of the base section 42A is configured such that two rectangular blocks are arranged on top of each other in the height direction Y and another rectangular block is arranged on the two rectangular blocks behind the two rectangular blocks in the front-rear direction X of the lamp 20. Accordingly, the end portion of the base section 42A of the light guide lens 42 has a bump-shaped cross section. An end face of the end portion of the base section 42A has light entry end faces 43a, 43b, 43c, each having a partial spherical shape and positioned on an end face of a corresponding one of the rectangular blocks. The cross section of the base section 42A decreases gradually in thickness and width toward the extending section 42B, and is connected to the extending section 42B. The extending section 42B has a small wall thickness, and a cross section of the extending section 42B has a rectangular shape having a narrow width (for example, a width of about 6 mm).

More specifically, the end portion of the base section 42A of the light guide lens 42 is formed to have a cross section having a width and a thickness that substantially correspond to the arrangement of three LEDs 32a, 32b, 32c in the vertical and front-rear directions. The width and the thickness of the end portion reduce gradually up to its border with respect to the extending section 42B, where the rectangular cross section of the extending section 42B has the width (for example, a width of about 6 mm) and thickness that substantially correspond to a single LED.

The LED unit assembly 30 is configured such that the three LEDs 32a, 32b, 32c, a pair of connection terminals 33 and other electronic components are mounted on the printed board 31. The LED unit assembly 30 is accommodated in the light source chamber 23c of the base section 22A of the lamp body 22, while the LEDs 32a, 32b, 32c are arranged such that they are directly face the respective light entry end faces 43a, 43b, 43c of the light guide lens 42. The LEDs 32a, 32b, 32c are configured to function as a light source of the side turn signal lamp 20.

The LEDs 32a, 32b, 32c are arranged side by side in the front-rear direction X and in the height direction Y of the side turn signal lamp 20, are arranged to directly face the light entry end faces 43a, 43b, 43c of the light guide lens 42, whereby light emitted from each of the LEDs 32a, 32b, 32c efficiency enters the light guide lens 42.

The connection terminal 33 is inserted through a terminal insertion hole 25 (see FIG. 2) formed in a cylindrical connector portion 24, whereby the LED unit assembly 30 is temporarily fixed at a given position in the light source chamber 23c. A seal leg 44a, which is formed along the perimeter of the skirt portion 44 of the light guide member 40, is welded to the peripheral edge portion 22a of the lamp body 22, whereby the printed board 31 of the LED unit assembly 30 is positioned and fixed by a pair of protrusions 48 on the rear surface of the light guide member 40.

As a result, the three LEDs 32a, 32b, 32c of the LED unit assembly 30 are positioned and fixed so as to directly face the three light entry end faces 43a, 43b, 43c of the light guide lens 42 respectively.

The LED unit assembly 30 accommodated in the light source chamber 23 of the lamp body 22 is, as shown in FIG. 2, covered by the wide base section 44A of the skirt portion 44 of the light guide member 40, and the entire base section 44A of the skirt portion 44 is further covered by the outer side wall 11 of the housing 10. Therefore, the light emitting the LEDs 32a, 32b, 32c is prevented from leaking from the opening 12 to the outside of the housing 10.

As shown in FIG. 2, the light guide lens 42 is formed such that the thickness thereof gradually decreases from the base section 42A to the extending section 42B. Accordingly, a dimension of the lamp 20, having the light guide lens 42 attached to the lamp body 22, in a direction toward an inside of the side mirror housing 10 from the outer side wall 11 of the housing 10 can also be decreases toward the distal end thereof corresponding to the distal end of the side mirror housing 10.

Therefore, the side turn signal lamp 20 can be disposed to reach a portion near the distal end of the side mirror housing 10 in the range where the lamp 20 is prevented from interfering with the side mirror 50 stored inside the side minor housing 10. Thus, the light exit portion 42a1 of the light guide lens 42 can be disposed near the distal end of the side mirror housing 10, whereby the signal light from the side turn signal lamp 20 can reliably be visually recognized from a region obliquely rearward from the vehicle As shown in FIGS. 2 and 4, the rear surface of the light guide lens 42 has reflecting steps 45a, 45b, 45c, 45d, 45e, 45f. Each of the reflecting steps 45a, 45b, 45c, 45d, 45e, 45f is configured to totally reflect the light of the LEDs 32a, 32b, 32c entering into the light guide lens 42 from the light entry end faces 43a, 43b, 43c, and such that their inclination angles with respect to the front-rear direction of the vehicle decrease as they becomes closer to the distal end of the light guide lens 42.

A part of the light entered into the light guide lens 42 is sent out from the light exit portion 42a1 of the front surface 42a near the distal end so as to be distributed obliquely rearward with respect to the front-rear direction of the vehicle. Another part of the light entered into the light guide lens 42 is sent out from the longitudinal central position 42a2 on the front surface 42a so as to be distributed obliquely laterally with respect to the front-rear direction of the vehicle.

Figure 7:
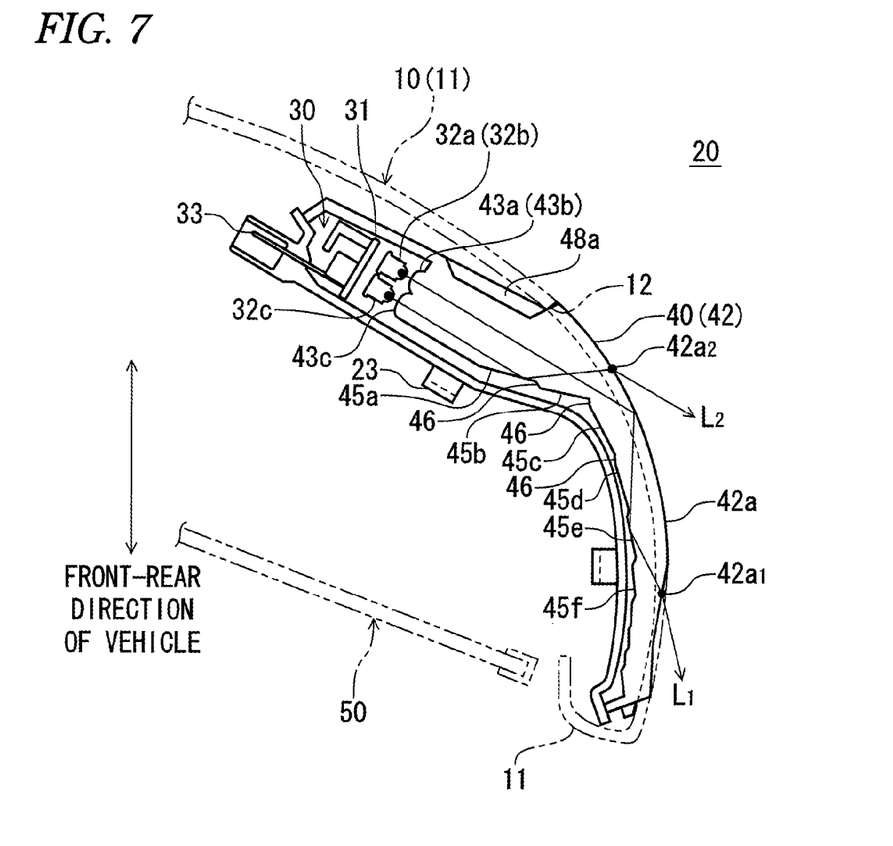
FIG. 7 is another horizontal sectional view of the side turn signal lamp illustrating a light guiding function of a light guide lens of the light guide member.

More specifically, as shown in FIG. 7, the light emitted from the LEDs 32a, 32b, which are disposed in front of the LED 32c in the front-rear direction of the lamp 20, and entered into the light guide lens 42 from the light entry end faces 43a, 43b, is totally reflected internally by the front surface 42a, and further reflected by the reflecting step 45e of the rear surface of the light guide lens 42 toward the light exit portion 42a1 near the distal end of the front surface 42a, thereby forming a first light distribution L1 oriented obliquely rearward (for example, an angle range of about −5 to 45 degrees) with respect to the front-rear direction of the vehicle.

The light exit portion 42a1 is configured as a curved surface having a curvature that is larger than a curvature of the longitudinally extending curve of the front surface 42a, so that the light from the LEDs 32a, 32b totally reflected and guided within the light guide lens 42 is reliably sent out as the first light distribution L1 without being totally reflected at the light exit portion 42a1. Especially, since the curvature of the light exit portion 42a1 is larger than the curvature of the entire front surface 42a, the angle range of the first light distribution L1 is large, for example, a range of about −5 to 45 degrees with respect to the front-rear direction of the vehicle, whereby the signal light from the lamp 20 can reliably be recognized from behind the vehicle.

The light emitted from the LED 32c disposed behind the LEDs 32a, 32b in the front-rear direction of the lamp 20 and entered into the light guide lens 42 from the light entry end face 43c, is reflected by the reflecting step 45a of the rear surface of the light guide lens 42 and is sent out from the longitudinally central position 42a2 on the front surface 42a, thereby forming a second light distribution L2 oriented obliquely laterally (for example, an angle range of about 50 to 80 degrees) with respect to the front-rear direction of the vehicle.

Therefore, the distribution light of the lamp 20 provides a light distribution which includes the first light distribution L1 oriented obliquely rearward from the vehicle and the second light distribution L2 oriented obliquely laterally from the vehicle. That is, the distribution light of the lamp 20 is guided to a wide range of about −5 to 80 degrees with respect to the front-rear direction of the vehicle and, thus, when the lamp 20 is turned on, the signal light from the lamp 20 can be recognized reliably.

The reflecting steps 45a, 45b, 45c, 45d, 45e, 45f are consecutively formed on the rear surface of the light guide lens 42 with level difference portions 46 between the adjacent reflecting steps. The respective level difference portions 46 reflect the light toward the front surface 42a such that rectangular light patterns are formed on the front surface 42a which respectively correspond to the reflecting steps 45a, 45b, 45c, 45d, 45e, 45f.

Further, at a central position on each of the reflecting steps 45a, 45b, 45c, 45d, 45e, 45f, a micro-spherical projection 47 is provided. The micro-spherical projections 47 reflect the light such that the central points of the respective rectangular light patterns formed on the front surface 42a by the level difference portions 46 are illuminated in a dotted manner to provide an innovative design.

On the front surface side of the base section 44A of the skirt portion 44 of the light guide member 40, recessed portions 48a, 49 are at positions respectively corresponding to the large thickness portions, i.e. the pair projections 48 and the base section 42A of the light guide lens 42 on the rear side. These recessed portions 48a, 49 serve to save the resin material, and to prevent a mold sink from being formed in the large thickness portions. This also shortened the time required to form the light guide member 40.

As shown in FIGS. 5 and 6, a protector 60 made of elastic material such as sponge or rubber is arranged between the skirt portion 44 of the light guide member 40 and the rear surface of the housing 10 to surround the front surface 42a of the light guide lens 42. The protector 60 is configured and arranged to hold the housing 10 and the light guide member 40 such that they are prevented from shaking and directly touching each other, which would otherwise generate noises. Further, the protector 60 is configured and arranged to hold the housing 10 and the light guide member 40 such that a clearance is note formed therebetween, thereby preventing wind noises from occurring.

As shown in FIG. 2, a gap (a closed space) is provided between the light guide lens 42 and lamp body 22. When the side turn signal lamp 20 is turned off, this gap provides an appearance with an ample depth.

Figure 8:
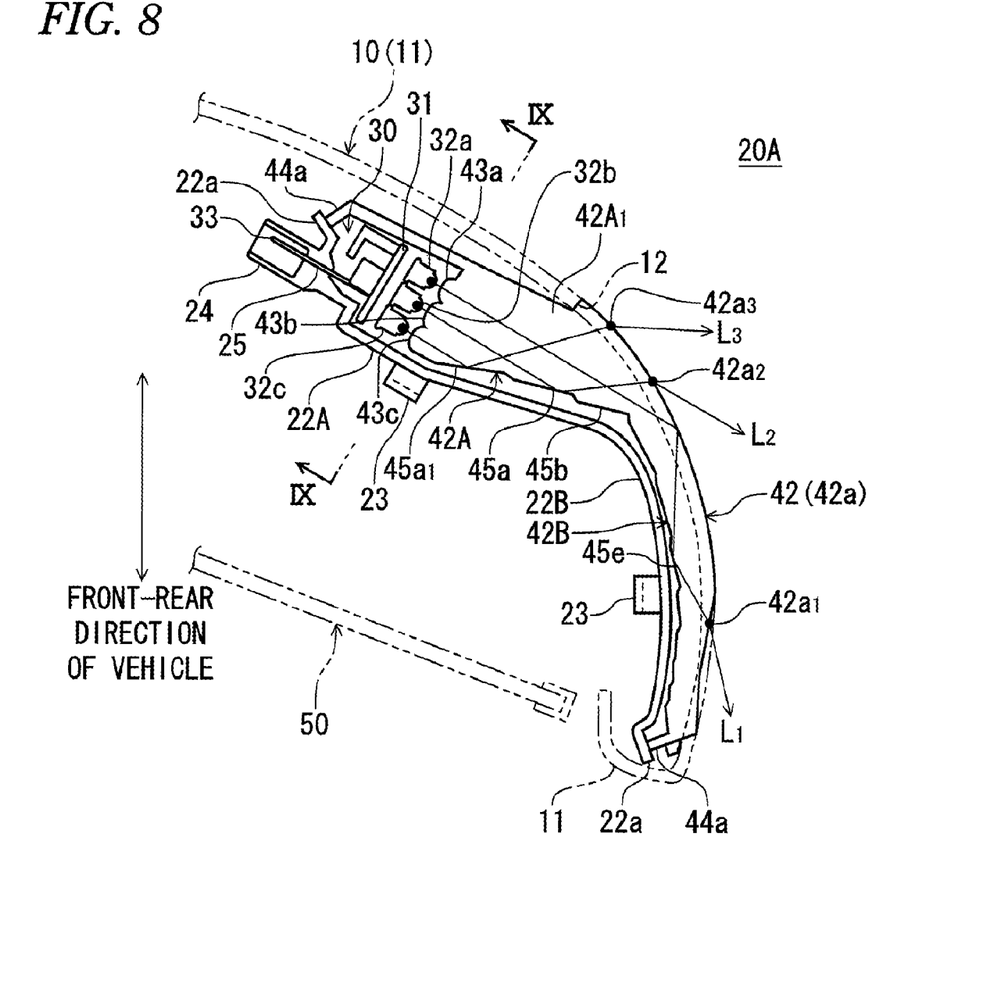
FIG. 8 is a horizontal sectional view of a side turn signal lamp according to a second exemplary embodiment of the invention, illustrating a light guiding function of a light guide lens of a light guide member.
Figure 9:
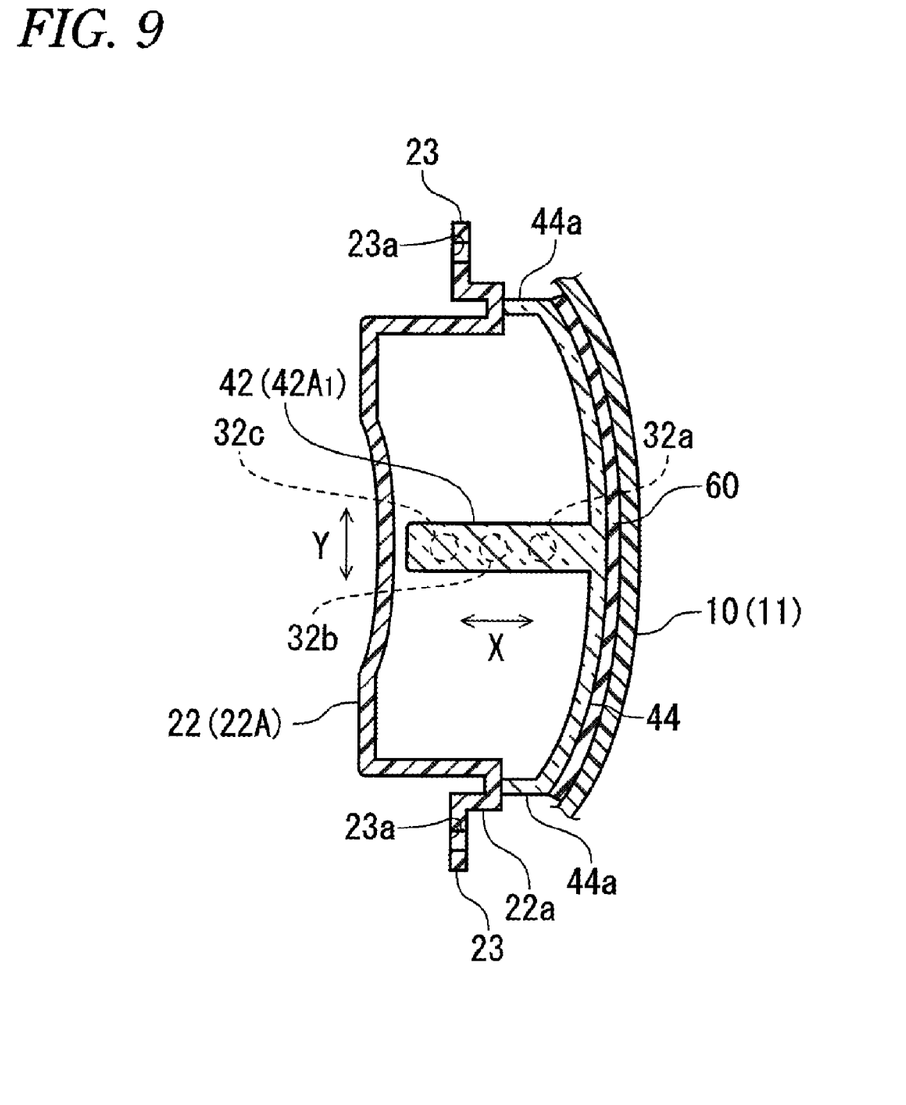
FIG. 9 is a vertical sectional view of the side turn signal lamp taken along the line IX-IX in FIG. 8.

FIGS. 8 and 9 illustrate a side turn signal lamp 20A according to a second exemplary embodiment of the invention. FIG. 8 is a horizontal sectional view and FIG. 9 is a longitudinal sectional view of the side turn signal lamp 20A.

According to the side turn signal lamp 20A of the second exemplary embodiment, three LEDs 32a, 32b, 32c are aligned in the front-rear direction X of the lamp 20A, while the entire light guide lens 42 is formed to have a uniform width that correspond to a size of a single LED. The base section 42A of the light guide lens 42 is formed to have a rectangular cross section extending in the front-rear direction X of the lamp 20A, i.e. in a direction in which in the LEDs 32a, 32b, 32c are aligned, whereby the LEDs 32a, 32b, 32c directly face the respective light entry end faces 43a, 43b, 43c.

Reflecting steps 45a, 45b, 45c, 45d, 45e, 45f, similar to those of the first exemplary embodiment, are formed on the rear surface side of the light guide lens 42 and, in addition, at a position corresponding to the light entry end face 43c, a reflecting step 45a1 is formed to totally reflect the light entering the light guide lens 42 from the LED 32c.

The light emitted from the LEDs 32a, 32b form first and second light distributions L1, L2, which are similar to those of the first exemplary embodiment. The light emitted from the LED 32c forms a third light distribution L3.

More specifically, the light emitted from the LED 32c and entered into the light guide lens 42 from the light entry end face 43c, is reflected by the reflecting step 45a1 of the rear surface of the light guide lens 42 toward a given position 42a3 on the front surface 42a near the longitudinal base section of the front surface 42a, thereby forming the third light distribution L3 oriented laterally (for example, an angle range of about 80 to 100 degrees) with respect to the front-rear direction of the vehicle.

Therefore, the light distribution of the lamp 20A includes the first light distribution L1 oriented obliquely rearward, the second light distribution L2 oriented obliquely laterally, and the third light distribution L3 oriented laterally with respect to the front-rear direction of the vehicle. That is, the light distribution of the lamp 20A is guided to a very wide range of about −5 to 100 degrees with respect to the front-rear direction of the vehicle. Therefore, the signal light from the lamp 20A, when turned on, can be visually recognized more reliably.

The base section 22A of the lamp body 22 is formed to have a depth that is sufficient to accommodate the thick base section 42A1 of the light guide lens 42.

Other portions of the second exemplary embodiment that are similar to those of the first exemplary embodiment will be denoted with the same reference numerals, and description thereof will be omitted.

In the first and second exemplary embodiments described above, a reflecting surface such as an aluminum deposited surface or a reflective painted surface is not formed on the inner side of the lamp body 22. However, a reflecting surface such as an aluminum vaporized surface or a reflective painted surface may be formed on the inner side of the lamp body 22. In this case, the light leaking from the rear surface of the light guide lens 42 can be returned back into the light guide lens 22, so that the light emitting from the LEDs can be used more efficiently as the light distribution of the side turn signal lamp.

While the present invention has been described with reference to a certain exemplary embodiment thereof, the scope of the present invention is not limited to the exemplary embodiment described above, and it will be understood by those skilled in the art that various changes and modifications may be made therein without departing from the scope of the present invention as defined by the appended claims.

What is claimed is:

1. A side turn signal lamp comprising:
   a light guide member comprising a light guide lens; and a plurality of LEDs configured to serve as a light source of the side turn signal lamp, wherein the light guide lens comprises:

a light entry end face from which light emitting from the LEDs enters the light guide lens, a front surface configured to correspond to a laterally extending opening in an outer side wall of a side mirror housing so as to guide the light through the opening, and a rear surface comprising a plurality of reflecting steps having inclination angles, wherein the inclination angles of the reflecting steps with respect to the front-rear direction of a vehicle decrease towards the distal end of the light guide lens, wherein the light guide lens is configured to have a width that corresponds the opening having a shape of a slit in a front view and such that the light entry end face extends in a front-rear direction of the side turn signal lamp, and the LEDs are arranged in the front-rear direction to directly face the light entry end face.

2. The side turn signal lamp according to claim 1, wherein the light guide lens is configured such that a thickness of the light guide lens decreases toward a distal end of the light guide lens.

3. The side turn signal lamp according to claim 1, wherein the light guide member further comprises a light exit portion configured as a curved surface having a curvature that is larger than a curvature of the longitudinally extending curve of the front surface.

4. The side turn signal lamp according to claim 1, wherein the reflecting steps further comprises level difference portions, wherein the level difference portions reflect the light toward the front surface such that rectangular light patterns are formed on the front surface.

5. The side turn signal lamp according to claim 4, wherein the reflecting steps further comprises a micro-spherical projection, wherein the micro-spherical projection reflect the light such that the central points of the rectangular light patterns formed on the front surface by the level difference portions are illuminated in a dotted manner.

6. A side turn signal lamp comprising:

a light guide member comprising a light guide lens; and a plurality of LEDs configured to serve as a light source of the side turn signal lamp, wherein the light guide lens comprises:

a light entry end face from which light emitting from the LEDs enters the light guide lens, and a front surface configured to correspond to a laterally extending opening in an outer side wall of a side mirror housing so as to guide the light through the opening, wherein the light guide lens is configured to have a width that corresponds the opening having a shape of a slit in a front view and such that the light entry end face extends in a front-rear direction of the side turn signal lamp, and the LEDs are arranged in the front-rear direction to directly face the light entry end face, wherein the light guide lens further comprises a rear surface comprising a first reflecting step and a second reflecting step, and the LEDs comprises a first LED and a second LED arranged behind the first LED in the front-rear direction, wherein the first reflecting step is configured to reflect a first part of the light entering the light entry end face from the first LED to form a first light distribution outgoing from a first position on the front surface, the second step is configured to reflect a second part of the light entering the light entry end face from the second LED to form a second light distribution outgoing from a second position on the front surface, a distance from the light entry end face to the first position is longer than a distance from the light entry end face to the second position, and the first light distribution is oriented more rearward than the second light distribution.

7. A side turn signal lamp comprising:

a light guide member comprising a light guide lens; and a plurality of LEDs configured to serve as a light source of the side turn signal lamp, wherein the light guide lens comprises:

a light entry end face from which light emitting from the LEDs enters the light guide lens, and a front surface configured to correspond to a laterally extending opening in an outer side wall of a side mirror housing so as to guide the light through the opening, wherein the light guide lens is configured to have a width that corresponds the opening having a shape of a slit in a front view and such that the light entry end face extends in a front-rear direction of the side turn signal lamp, and the LEDs are arranged in the front-rear direction to directly face the light entry end face, a lamp body comprising a bracket via which the side turn signal lamp is attached to the side mirror housing;

a printed board on which the LEDs are mounted; and a connection terminal arranged to protrude from the printed board, wherein the light guide member further comprises:

a skirt portion arranged to surround the light guide lens; and a seal leg arranged along a perimeter of the skirt portion, wherein the light guide member is configured as a one-piece structure, the LEDs, the printed board, and the connection terminal are arranged to form an LED unit assembly, and the seal leg of the light guide member is joined to the lamp body such that the LED unit assembly is accommodated in a space between the light guide member and the lamp body.

8. The side turn signal lamp according to claim 7, wherein the light guide member further comprises a pair of protrusions configured and arranged to fix a position of the printed board.

* * * * *